United States Patent [19]

Grossen et al.

[11] 4,034,229

[45] July 5, 1977

[54] OZONE GENERATING APPARATUS

[75] Inventors: Walter Grossen, Riehen; André Gagnaux, Kaiseraugst; Edgar Chariatte, Oberwil, all of Switzerland

[73] Assignee: Fr. Sauter AG., Fabrik elektr. Apparate, Basel, Switzerland

[22] Filed: Nov. 5, 1975

[21] Appl. No.: 628,929

[30] Foreign Application Priority Data

June 10, 1975 Switzerland .................. 7487/75

[52] U.S. Cl. .............................. 250/541; 250/532
[51] Int. Cl.$^2$ ................................... C01B 13/11
[58] Field of Search ................ 250/532–541; 204/176

[56] References Cited

UNITED STATES PATENTS

| 607,007 | 7/1898 | Andreoli | 250/532 |
|---|---|---|---|
| 955,818 | 4/1910 | Lohman | 250/532 |
| 2,128,455 | 8/1938 | Darling | 250/532 |
| 3,801,791 | 4/1974 | Schaefer | 250/532 |
| 3,872,313 | 3/1975 | Emigh et al. | 250/541 |

Primary Examiner—John H. Mack
Assistant Examiner—Aaron Weisstuch
Attorney, Agent, or Firm—Toren, McGeady and Stanger

[57] ABSTRACT

A corona discharge ozone generating apparatus comprises a plurality of plate-like electrodes arranged in a stack. Alternate ones of the electrodes are electrically earthed, hollow and have a fluid medium passed therethrough for cooling. The remaining electrodes are each mounted on respective insulating frames sandwiched between two plates of dielectric material. Each frame, and the electrode and dielectric plates which are carried thereby, bound a pair of discharge spaces in which ozone is generated and the frame includes two end portions which hold the electrode and plates, one end portion having holes therein communicating with the interior of a housing in which the stack is located so as to admit air or oxygen gas to the interior of the discharge space while the other end portion has openings therein communicating with a conduit for removing generated ozone from the housing. The second end portion is provided with sealing lips surrounding the openings therein so as to permit a leak-tight seal to the conduit.

12 Claims, 6 Drawing Figures

OZONE GENERATING APPARATUS

The invention relates to an apparatus for generating ozone by corona discharges between plate-like electrodes which are separated by a dielectric.

Various attempts have been made to produce ozone generators which are cheap to manufacture and are efficient and reliable in operation. Such attempts have not, however been entirely successful. For example, ozone generators of the type described in West German Auslegeschrift 1,101,375 have the disadvantage that all the electrodes are surrounded on all sides by a dielectric in order to avoid corrosion during the discharge. Removal of the heat generated is thus poor and efficiency is reduced.

West German Patent Specification No. 1,146,038 describes an ozone generator in which each of the cooled electrode plates has a cast-in coiled pipe through which the cooling liquid flows. This has the disadvantage that the electrode plates distort in operation due to the different coefficients of thermal expansion of the various materials, resulting in an alteration of the spatial dimensions of the discharge spaces and this is particularly inconvenient when the dielectric is arranged as two or more layers of insulating plates as the efficiency is thus reduced.

The ozone generator described in West German Patent Specification No. 1,228,592 again has high-voltage electrodes which are surrounded on all sides by a dielectric. This leads to poor removal of heat and differing electric field strengths result at the edges or corners of the plate-shaped high-voltage electrodes. These disadvantages become manifest in poor efficiency.

The ozone generator described in West German Offenlegungschrift No. 2,340,992 has the disadvantage that each of the discharge spaces has a separate feedline for the gas and a separate outline for the ozone as well as a gasket along the rim of the discharge space. This produces difficulties in achieving the requisite general tightness of the entire array particularly where there are many discharge spaces.

According to the present invention, there is provided apparatus for generating ozone by corona discharge, such apparatus comprising: at least one first electrode assembly including a first electrode formed of an electrically conductive plate, a plate of dielectric material and a frame of insulating material for supporting the first electrode and dielectric plate in spaced-apart relationship with a discharge space therebetween in which space, in use of the apparatus, ozone is generated, the frame comprising first and second end portions which are disposed at opposite edges of the dielectric plate and each hold the corresponding edges of the first electrode and dielectric plate, the first end portion having at least one first opening therein for admitting gas to said discharge space, and the second end portion having both at least one second opening therein for the outflow of ozone from the discharge space and means for sealing the or each second opening therein gas tight to a conduit for receiving the generated ozone; a respective second electrode associated with the or each first electrode assembly, the or each said second electrode comprising an electrically conductive plate member disposed so that the dielectric plate is between the plate member and the first electrode so that, in use, a corona discharge occurs in said discharge space; and fluid cooling means effective, in use, to cool the or each second electrode.

This arrangement requires only simple components and ensures that over long periods of operation, the electrodes remain parallel and that an even flow of air or ozone passes through the discharge spaces.

The construction of the first electrode assembly ensures the requisite seal of the discharge spaces, allowing at the same time for the expansion due to the unavoidable heat load.

All the individual parts can be so constructed and mutually arranged that the ozone generator can be manufactured simply, can be readily transported without damage to the electrodes and the dielectric, and requires little maintenance at its place of use.

The invention will be further described, by way of example, with reference to the accompanying drawings, in which:

FIG. 1b is a side view of the high-voltage electrode pack of FIG. 1a;

Figure 1A:
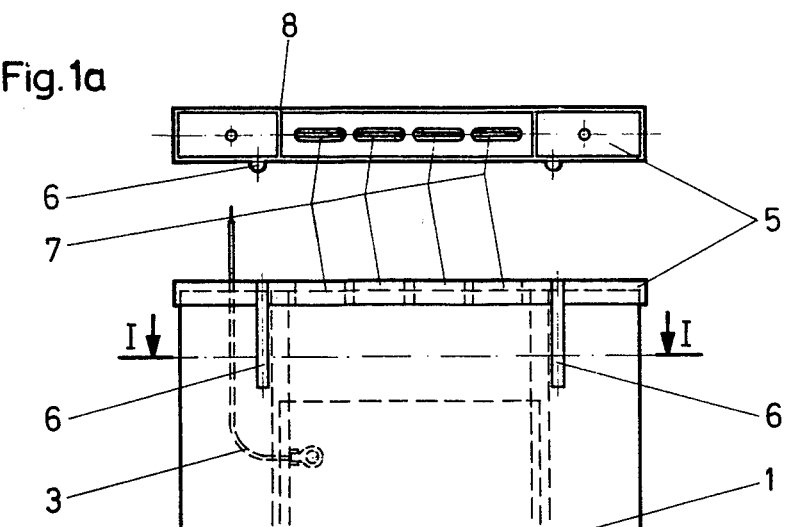
FIG. 1a is a plan view of the upper moulding of a high-voltage electrode pack for an embodiment of the present invention.
Figure 1B:
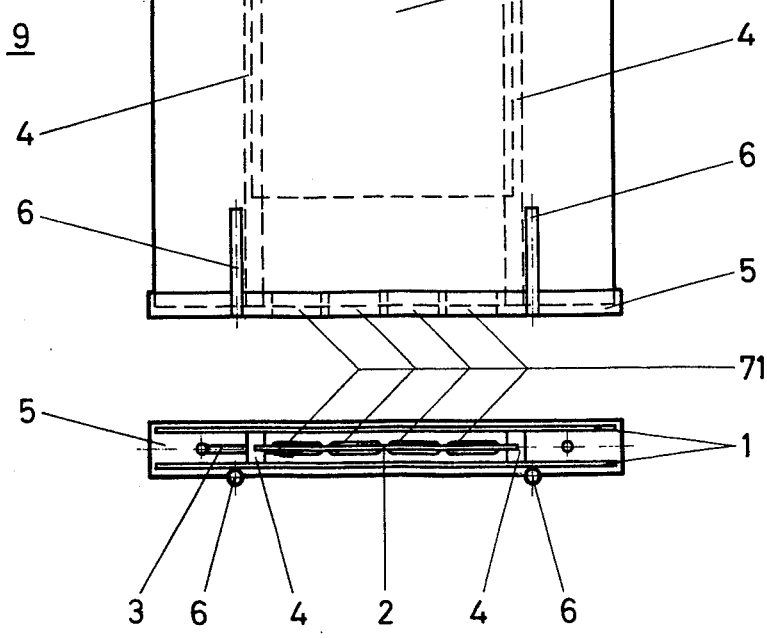
Figure 1C:
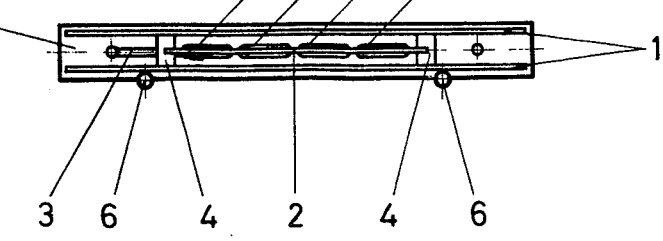
FIG. 1c is a sectional view of the electrode pack in the section plane I—I of FIG. 1b.

In the following text the FIGS. 1a, 1b and 1c are described together. A plate shaped high-voltage electrode 2, which is shown particularly well in FIG. 1c, is located between and parallel to two dielectrics 1. The two longer sides or edges of electrode 2 are located in two spaces 4 of insulating material which are each U-shaped. These spacers 4 ensure a defined distance between the high-voltage electrode plate 2 and two plates 1 of dielectric material between which the electrode 2 is sandwiched, the electrode 2 being parallel to the plates 1. This is shown particularly well in FIG. 1c. As shown in FIG. 1b, the upper end of the high-voltage electrode plate 2 has attached thereto a supply line 3 for connecting it to a high-voltage source which is not shown. Upper and lower mouldings 5 are provided which are so designed that the plates 1 of dielectric and the U-shaped spacers 4 which firmly hold the narrow sides of the high-voltage electrode plate 2 are combined to a high-voltage electrode pack 9. FIG. 1b shows that the plates 1 are wider and taller than the electrode 2. As shown in FIG. 1a the upper moulding 5 has openings 7 for the inflow of air or oxygen into the discharge spaces between the dielectric plates 1 and the electrode 2. Similarly, the lower moulding 5 has openings 71 for the outflow of ozone. Each moulding 5 has, on its outside, a pair of vertically extending projections 6 for holding a cooled electrode 30. A lateral shift of the electrode 30 is limited by these projections 6. For this reason these projections 6 are mutually spaced apart a distance approximately the same as the width of the high-voltage electrode plate 2. This ensures that the cooled electrode 30 is held in a position in register with and an parallel with the high-voltage electrode 2 while being spaced therefrom. The elastic mouldings 5 have, on their surfaces facing away from the electrode 2 sealing lips 8. The sealing lips 8 on the lower moulding 5 surround the openings 71 and serve to seal the high-voltage electrode pack 9 against a receiver 26 (FIG. 3) collecting the ozone. Of course, only the lower moulding 5 need have such lips 8; however, for convenience, the upper and lower mouldings 5 are substantially identical.

Figure 2:
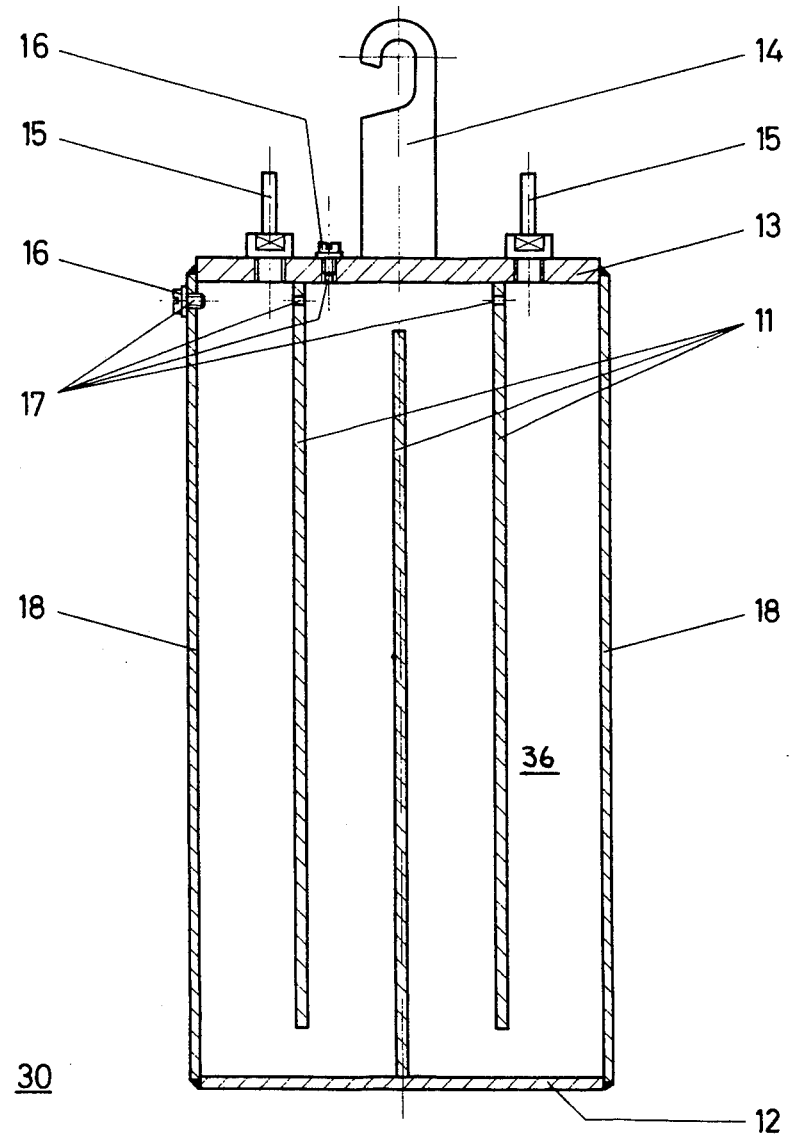
FIG. 2 is a sectional representation of a cooled electrode for an embodiment of the invention.

FIG. 2 shows a section of a cooled electrode 30, the casing of which comprises a thin-walled profiled body manufactured by a drawing process. This profiled body comprises walls 18 and baffles 11 as well as two parallel plate members, only one of which, 36, is shown. The profiled body is cut off to the desired length, the baffles 11 being alternately shortened as is shown in FIG. 2. The bottom 12 of the casing and the top 13 are then tightly joined to the walls 18 either by glueing, by soldering or by welding. A tight joint between the bottom 12 of the casing, the lid 13 and the baffles 11 is not necessary. This particular design of the cooled electrode results, on the one hand, in cheap and efficient manufacture and, on the other hand, in a well defined path for a cooling medium, so that uniform heat removal during operation is ensured over the entire surface of the electrode 30. Inflow and outflow of the gaseous or liquid cooling medium take place through the connections 15 in the lid 13. Furthermore, orifices 17 are provided in the lid and also in those baffles 11 which make contact with the lid 13. These orifices provide for venting of the channels for the cooling medium, which are defined by the baffles 11. The orifices 17 which open outwardly of the electrode 30 are tightly closed by a screw 16 and can be opened for venting if required. Over the entire period of operation, the vent orifices 17 in the baffles 11 serve to prevent so-called "air pockets" in the channels of cooling medium. On the top 13 of the electrode 30 is a bow or hook 14 which serves a dual function, since as shown in FIG. 3, it suspends the cooled electrode 30 on a collector main 25 and is responsible for making good contact with the collector main 25 which is connected to the other pole of the high-voltage source (not shown), the collector main 25 in the arrangement shown in FIG. 3 being normally connected to the frame or to earth.

Figure 3:
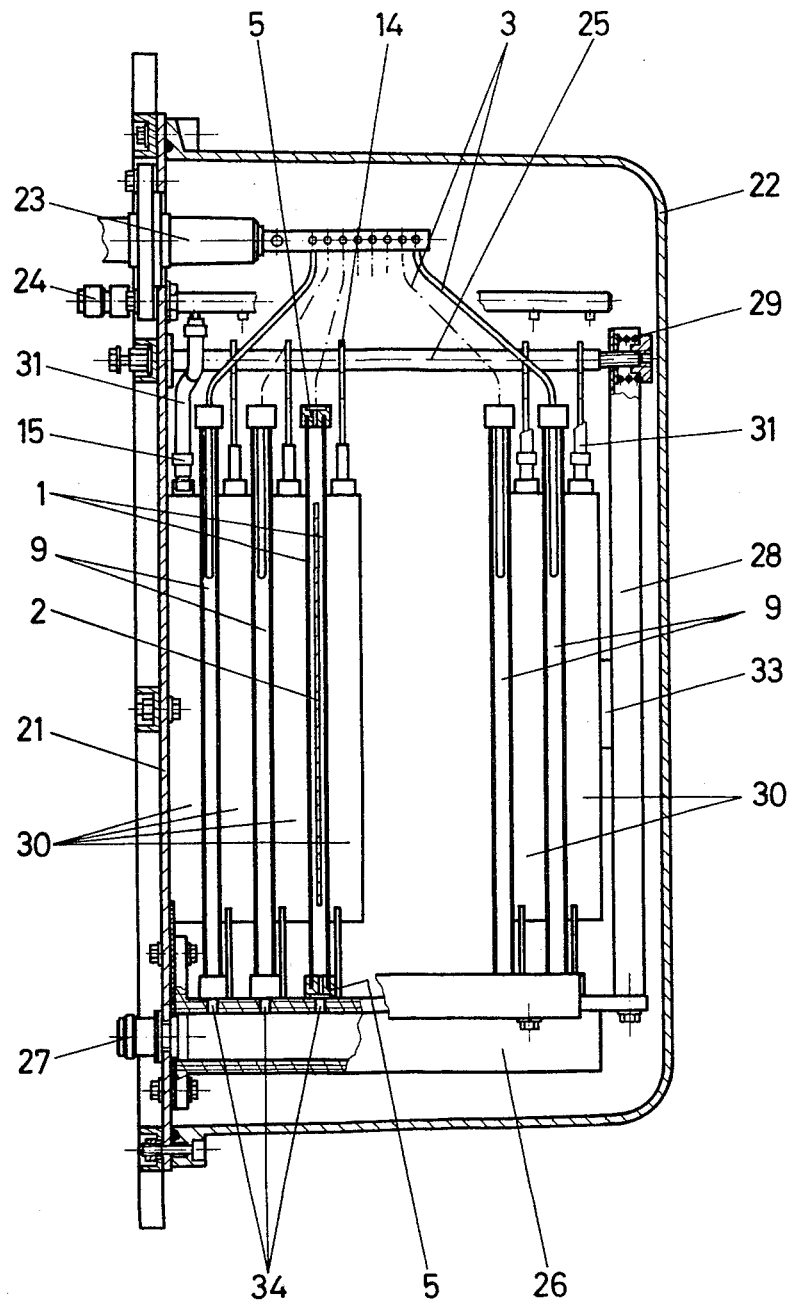
FIG. 3 is a partially sectional view of an array of several high-voltage electrode packs and cooled electrodes in an embodiment of ozone generator according to the invention.
Figure 4:
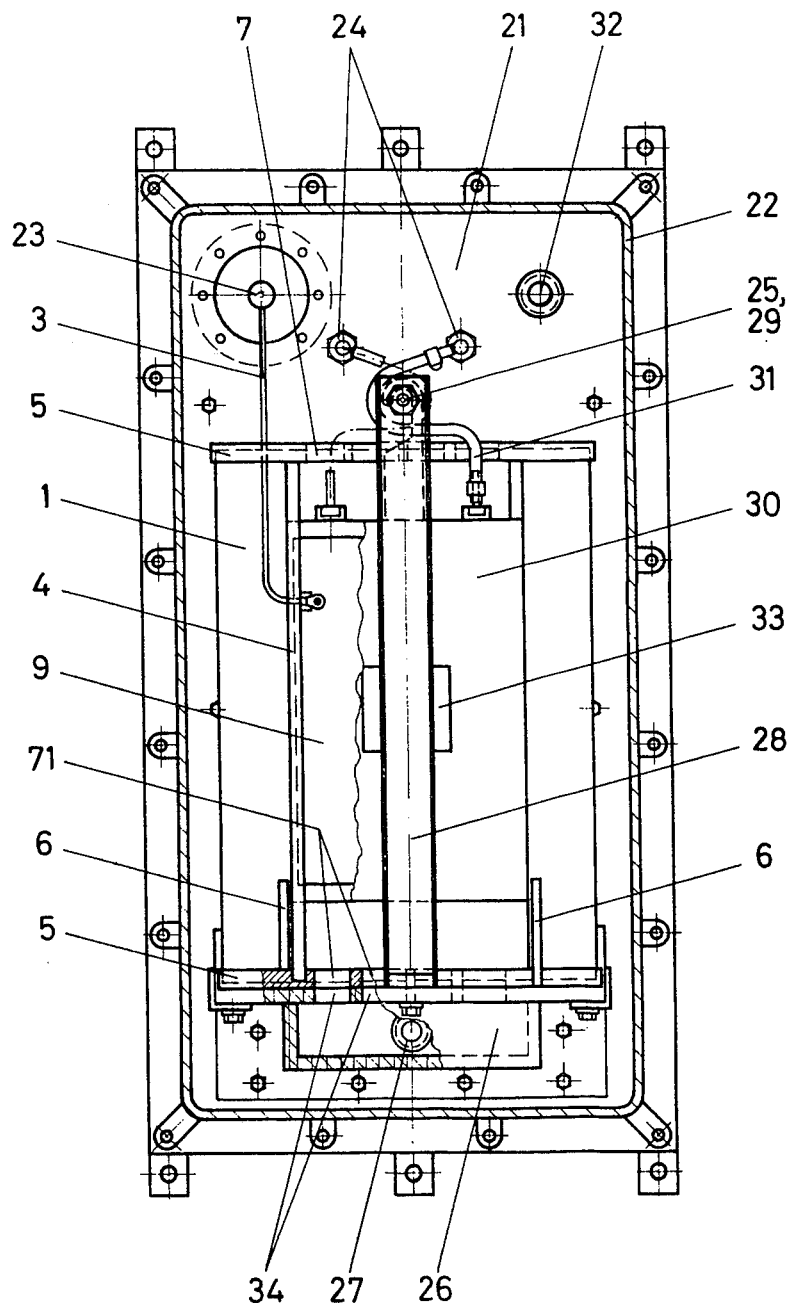
FIG. 4 is a partially sectional plan view of the ozone generator of FIG. 3.

FIG. 3 is a side view, partly in section of an array of several high-voltage electrode packs 9 and cooled electrodes 30, inside an ozone generator. A bus-bar 23 is fixed to base plate 21 by means of an insulating bushing suitable for withstanding the operating voltage. The base plate 21 also has two connections 24, only one of which is shown in FIG. 3 in partial section, for the distribution and removal of cooling medium, to and from the cooled electrodes 30. As already mentioned, one end of the collector main 25 is also fixed in the base plate 21. The receiver 26 which collects the ozone from the various high-voltage electrode packs 9 via the openings 34 is fastened in the base plate 21 by its fitting 27. As shown in FIG. 3, each high-voltage electrode pack 9 is connected to the high-voltage bus-bar 23 via the line 3 and is located between two cooled electrodes 30. The exact arrangement of the line 3, which allows for previously maintaining the required air clearances from earthed parts, can be seen from FIG. 1b. As already mentioned in connection with FIG. 2, the cooled electrodes 30 are suspended on the horizontally extending collector main 25 by means of hooks 14 and for better clarity in FIG. 3 only one hook has been given the reference number 14. It can also be seen from FIG. 3 that each cooled electrode 30 has a fitting 15 for the connecting line 31 to the distributor 24, although in the interests of clarity only one such connecting line 31 has been drawn in. Owing to the particular layout of the connecting lines 31 around the collector main 25 (FIG. 4), it is possible to swing the cooled electrodes 30 out sideways for maintenance purposes without it being necessary to undo any connections. The same simplification of maintenance work also applies to the high-voltage electrode packs 9 which can also be pulled out sideways after simply disconnecting the few ends of the feedlines 3 from the bus-bar 23 (FIGS. 3 and 4). A fitting 32 is provided in the base plate 21, through which air or pure oxygen is introduced into the casing formed by the base plate 21 and a hood 22. Within the casing of the complete array, the air then passes through the openings 7 of the upper mouldings 5 (FIG. 1a) into the discharge spaces between the dielectric plates 1 and the plate 2. The thus provided ozone flows out of these discharge spaces via the slots 71 in the lower moulding 5 (FIG. 1b) and via the corresponding openings 34 of the receiver 26 (FIG. 3), to be removed from the device via the fitting 27.

Means are provided for clamping the entire array of packs 9 and cooled electrodes 30 so that they are tightly compressed. These clamping means comprise a clamping lever 28, one side of which is located in an element fastened to the receiver 26 and the other end of which engages the collector main 25. A pressure spring 29 acts on the clamping lever 28 so that the latter tightly compresses the array of electrodes via a compression distance piece 33. The complete array consists of very diverse materials with widely differing temperature coefficients, so that unavoidable thermal expansions result, the effects of which can, however, be overcome by this special arrangement. The requisite tightness of the discharge spaces is ensured, for the entire period of operation, by the mouldings 5 and by the sealing lips 8 which engage the receiver 26.

We claim:

1. Apparatus for generating ozone by corona discharge, comprising first electrode means and second electrode means, said first electrode means comprising at least one assembly, said assembly comprising a first electrode consisting of an electrically conductive plate having a pair of oppositely directed face surfaces, a pair of side edges extending along the opposite sides of said face surfaces and a pair of end edges extending transversely of the side edges and along the opposite ends of said face surfaces, a pair of spacers formed of insulating material and extending in the same direction as said side edges, each said side edge fitted into a different one of said spacers, a pair of plates of dielectric material each located spaced outwardly from a different one of the face surfaces of said electrically conductive plate, each said dielectric material plate comprising a pair of side edges extending in the same direction as said side edges of said electrically conductive plate and a pair of end edges extending in the same direction as said end edges of said electrically conductive plate, said side edges and end edges of said dielectric material plates being longer than the corresponding side edges and end edges of said electrically conductive plate, said spacers having a length corresponding to the length of the side edges of said dielectric material plates, a pair of end portions disposed in spaced relation and extending in the same direction as said end edges of said dielectric material plates, each said end portion having one end edge of each said dielectric plate inserted therein, the opposite ends of said spacer being located within said end portions, each said spacer extending in the direction between the face surfaces of said electrically conductive plate between the facing surfaces of the pair of said dielectric material plates and said end portions, said spacers, and the facing surfaces of said dielectric material plates defining a discharge space containing said electrically conductive plate and within which ozone is generated, one of said end portions having at least one first opening therein for admitting gas to said discharge space, the other said end portion having at least one second opening therein for the outflow of ozone gas from the discharge space, a conduit for receiving ozone from said second opening, means for sealing said second opening to said conduit, said second electrode means comprising at least two said second electrodes associated with each said assembly and each said second electrode located adjacent a different one of said dielectric material plates, each said second electrode comprising an electrically conductive plate member, and means for contacting said plate member with the adjacent said dielectric material plate of said first electrode so that in use a corona discharge occurs in said discharge base, and means for cooling said second electrode means with a fluid medium.

2. Apparatus according to claim 1, further comprising spacer means projecting from said end portions and engaging the plate member of the associated second electrode.

3. Apparatus according to claim 1, wherein each second electrode is hollow, and further comprising baffles in each hollow second electrode to provide a tortuous path for a fluid medium through the second electrode.

4. Apparatus according to claim 3 and including means defining apertures in the baffles.

5. Apparatus according to claim 3 wherein each second electrode further comprises pipe fittings for connection to pipes for conveying said fluid medium.

6. Apparatus according to claim 1 further comprising hook means on each second electrode for enabling it to be suspended and for providing an electrical connection to said plate member.

7. Apparatus according to claim 1 wherein said first electrode means comprise a plurality of first electrode assemblies arranged with the second electrodes in alternation in the form of a stack.

8. Apparatus according to claim 7 further comprising means for resiliently compressing such stack.

9. Apparatus according to claim 7 further comprising a common horizontally extending bus-bar to which the first electrodes are electrically connected and a horizontally extending support from which the second electrodes are slidably suspended and to which support the second electrodes are electrically connected whereby a high voltage may be applied across the first and second electrodes.

10. Apparatus according to claim 1, further comprising a tubular member for receiving generated ozone from said first electrode means and on which each said electrode assembly rests.

11. Apparatus according to claim 1 and including: a housing enclosing each electrode assembly and each second electrode, each first opening defined in one end portion being in open fluid communication with the interior of said housing; and an inlet for said housing for admitting air or oxygen gas to the interior of said housing.

12. Apparatus according to claim 1 wherein said end portions are each formed of substantially identical elastic moldings.

* * * * *